US008684445B2

(12) United States Patent
Ellinghaus et al.

(10) Patent No.: US 8,684,445 B2
(45) Date of Patent: Apr. 1, 2014

(54) VEHICLE DOOR ARRANGEMENT

(75) Inventors: Thomas Ellinghaus, Braunschweig (DE); Frank Heinisch, Meine (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/531,922

(22) Filed: Jun. 25, 2012

(65) Prior Publication Data

US 2012/0272578 A1 Nov. 1, 2012

(30) Foreign Application Priority Data

Dec. 24, 2009 (DE) ......................... 10 2009 060 367

(51) Int. Cl.
*B60J 5/06* (2006.01)

(52) U.S. Cl.
USPC ...................................... 296/155; 296/146.12

(58) Field of Classification Search
USPC ......... 296/155, 146.6, 146.5, 146.12, 146.11, 296/146.4; 49/360, 502
See application file for complete search history.

(56) References Cited

U.S. PATENT DOCUMENTS

| | | | | |
|---|---|---|---|---|
| 6,183,039 | B1 * | 2/2001 | Kohut et al. | 296/155 |
| 6,793,268 | B1 * | 9/2004 | Faubert et al. | 296/146.12 |
| 2005/0212324 | A1 * | 9/2005 | Mittermeier et al. | 296/146.5 |
| 2012/0031004 | A1 * | 2/2012 | Boettcher | 49/154 |

FOREIGN PATENT DOCUMENTS

| | | | |
|---|---|---|---|
| CH | 318 747 | A | 1/1957 |
| DE | 23 09 313 | A | 9/1974 |
| DE | 29 16 896 | A1 | 11/1980 |
| DE | 103 41 922 | A1 | 4/2005 |
| EP | 1 264 718 | A1 | 12/2002 |
| FR | 2 454 922 | | 11/1980 |
| FR | 2 455 523 | A1 | 11/1980 |
| GB | 902 405 | A | 8/1962 |
| GB | 1 444 219 | | 7/1976 |

* cited by examiner

*Primary Examiner* — Joseph Pape
*Assistant Examiner* — Dana Ivey
(74) *Attorney, Agent, or Firm* — Muncy, Geissler, Olds & Lowe, P.C.

(57) ABSTRACT

A vehicle door arrangement having a vehicle door for closing a door opening in a bodywork of a vehicle, in particular a motor vehicle, and having a pivoting device, which comprises a carrier arm bearing the weight of the vehicle door and at least one guide arm controlling the movement of the vehicle door, wherein the carrier arm and the guide arm are of the same length and are arranged pivotally mounted on the vehicle door and the bodywork in such a way that the arms form a parallelogram. The support arm is pivotally mounted level with a horizontal bodywork section defining a lower limit of the door opening.

15 Claims, 4 Drawing Sheets

VEHICLE DOOR ARRANGEMENT

This nonprovisional application is a continuation of International Application No. PCT/EP2010/007394, which was filed on Dec. 6, 2010, and which claims priority to German Patent Application No. DE 102009060367.0, which was filed in Germany on Dec. 24, 2009, and which are both herein incorporated by reference.

BACKGROUND OF THE INVENTION

1. Field of the Invention

The present invention relates to a vehicle door arrangement with a vehicle door for closing a door opening in a bodywork of a vehicle, in particular of a motor vehicle, and with a pivot device that comprises a carrying arm bearing the weight of the vehicle door and at least one guide arm controlling the movement of the vehicle door, wherein the carrying arm and the guide arm have the same length and are arranged in a pivotally mounted manner on the door and the bodywork such that they form a parallelogram.

2. Description of the Background Art

Vehicle door arrangements are known from the prior art. In particular as an alternative to sliding doors, vehicle doors with a parallelogram guide are used in order to clear or to close a door opening without thereby performing a space-consuming movement, such as occurs, for example, with conventional hinged doors.

Thus, for example, GB 902 405 A discloses a vehicle door in which a carrying arm and a guide arm are provided, which have the same length and are arranged such that they form a parallelogram. As a result, during its movement the vehicle door is always aligned identically to the vehicle bodywork. It is thereby provided that the guide arm is arranged pivotally mounted on the underside and the carrying arm is arranged in pivotally mounted at mid-height of the vehicle door.

SUMMARY OF THE INVENTION

It is therefore an object of the invention to provide a vehicle door arrangement, which, on the one hand, ensures a stable guidance of even heavy vehicle doors and, on the other hand, renders possible a high degree of design freedom for the vehicle door.

The vehicle door arrangement according to an embodiment of the invention provides that a carrying arm is pivotally mounted at the height of a horizontal bodywork section delimiting the door opening at the bottom. A door opening is usually defined or formed at the sides by vertical bodywork sections and at the top and at the bottom by corresponding horizontal bodywork sections. Of course, there are also doors that have, for example, several horizontal bodywork sections offset with respect to one another. However, then only the lowest horizontal bodywork section in fact delimits the door opening at the bottom. The carrying arm is thus pivotally mounted in a region that lies below the door opening. The carrying arm thereby bears the vehicle door accordingly on its lowest section, which is generally used to cover the lower horizontal bodywork section in the closed position. This has several advantages. On the one hand, the holding force for the vehicle door is introduced into the vehicle door from below in a targeted manner, whereby a clearly determined support of the vehicle door is ensured. Starting from the bottom, the force can be transmitted in a targeted manner by simple measures to the bearing construction elements of the vehicle door. On the other hand, the pivoted carrying arm now is in a region that cannot be seen by a person located in the vehicle, so that the side or surface of the vehicle door facing towards the interior of the vehicle can be designed completely freely without a carrying arm projecting into the interior of the vehicle interfering with the design and the ergonomics of the vehicle door. Furthermore, the carrying arm can thereby be designed optimally with respect to its function, since an optically attractive design of the carrying arm is not important due to its hidden arrangement. Furthermore, it is conceivable to design the carrying arm and the horizontal bodywork section such that the carrying arm is supported and/or guided on the horizontal bodywork section at least over a certain pivoting range, whereby a secure closure of the vehicle door can always be ensured.

The guide arm can be pivotally mounted at least essentially at the same height as the carrying arm. It is thus provided hereby that the guide arm and the carrying arm form a parallelogram lying in one plane. Hereby, on the one hand, the kinematics of the parallelogram are represented in a particularly simple and stable manner, whereby a precise parallelogram guidance is ensured, and, on the other hand, the guide arm also lies outside the field of vision of a person in the interior of the vehicle. The outside as well as the inside of the vehicle door can be designed freely.

Furthermore, a bodywork-side end of the carrying arm can be connected to a pivot joint at an at least essentially vertical bodywork section. Thus while the carrying arm is pivotally mounted at the height of the horizontal bodywork section, the pivot joint forming the bodywork-side rotation axis is located on an at least essentially vertical bodywork section. Preferably, the pivot joint is located on the rear vertical bodywork section as viewed in the forward direction of travel, so that the vehicle door, which is preferably a rear door of the vehicle, can be pivoted backwards in order to clear the door opening. Particularly high forces can be transmitted by the carrying arm to the bodywork on the vertical bodywork section, for example, on the so-called C pillar, so that even heavy doors can be held securely.

According to an embodiment of the vehicle door arrangement it is provided that a vehicle door-side end of the carrying arm, that is, the end of the carrying arm lying opposite the bodywork-side end, is connected to a second pivot joint at least essentially in the horizontal center and/or in the horizontal center of gravity of the vehicle door. The second pivot joint is thus arranged centrally or at the point on a virtual horizontal line of the vehicle door, at the height of which the center of gravity of the vehicle door lies. It should be noted here that the terms horizontal and vertical are always directional data based on the vehicle door or the vehicle. Horizontal and vehicle do not thereby necessarily mean the same as an absolute horizontal or vertical alignment. The arrangement of the second pivot joint at the cited point has the advantage that the vehicle door is held in a particularly stable manner and the guide arm is not acted on with a carrying force. It can therefore be dimensioned/constructed optimally for guiding the vehicle door. The decisive distinction between carrying arm and guide arm, as has also already been described above, has the advantage that overall the pivot device of the vehicle door can be designed and constructed more simply, since distinct functions can be respectively assigned to the carrying arm and to the guide arm, wherein the carrying arm, of course, also performs a guide function. This simplifies the construction and increases safety.

Advantageously, the guide arm can be varied in its length and/or installation position. The parallelogram can thereby be adjusted, for example, to tolerances determined by manufacture or installation, so that a safe opening and closing of the vehicle door is always possible. Since, as described above, the guide arm does not have to be able to transmit high carrying forces, a variable length and/or installation position of the guide arm can be accomplished with simple means.

Advantageously, a further guide arm connected to the vehicle door and the bodywork is provided, which guide arm is pivotally mounted at the height of a horizontal bodywork section delimiting the door opening at the top. Thus three pivot arms forming the pivot device are provided, two of which are used solely to guide the vehicle door, wherein the second guide arm is arranged on the side of the vehicle door or the door opening lying opposite the first guide arm. Due to the pivotabiltiy at the height of the bodywork section delimiting the door opening at the top, the second guide arm also lies outside the field of vision, which further guarantees the freedom of design regarding the inside of the vehicle door. The further guide arm additionally stabilizes the vehicle door and in particular prevents the vehicle door from tilting away from the bodywork.

Furthermore, the vehicle door can have a cross bracing starting from the first pivot joint, that is, from the bodywork-side pivot joint of the carrying arm. The cross bracing thus has its origin at the first pivot joint. The holding force of the carrying arm can be introduced or transmitted into the vehicle door in a targeted manner via this cross bracing.

Advantageously, the cross bracing can be embodied at least essentially in a V-shaped manner, wherein the tip of the cross bracing lies on the first pivot joint or at least in the region of the first pivot joint and the cross bracing widens towards the top. To this end, the cross bracing expediently has at least two braces tilted towards one another and enclosing an angle, which expediently are connected to load-bearing elements of the vehicle door. The cross bracing is connected to the load-bearing elements of the vehicle door by suitable means, such as rivets, bolts or also by adhesion, welding and/or soldering.

To reinforce and stabilize the cross bracing, and thus the vehicle door and the vehicle door arrangement, the cross bracing can be provided with a connection plate at least in some regions, in particular in the region of the first pivot joint, which connection plate is expediently also embodied in a V-shaped manner. The connection plate can be connected to the two braces forming the cross bracing, for example, by riveting, screwing, adhesion and/or welding, so that the cohesion of the braces of the cross bracing is ensured.

Furthermore, at least one blocking component can be provided for holding the carrying arm in at least one open position of the vehicle door is assigned to the carrying arm. The blocking component prevents the vehicle door from closing accidentally, for example, due to gravitational force. The blocking component is advantageously embodied in a mechanically operating manner. The blocking component can thus be formed by a catch, a stop, by a corresponding alignment of the rotation axes of the various pivot joints or also by magnetic means. The alignment of the pivot axes should thereby be selected expediently such that the vehicle door when opened must overcome a crest, after which it is subsequently guided downwards a little again. This crest must therefore firstly also be overcome when closing.

It is also provided that the vehicle door can have at least one lock, in particular a pivot lock, and/or at least one automatic power closure. Advantageously, the lock and/or the power closure interact with an essentially vertical bodywork section of the door opening, wherein, if the lock as well as power closure are provided, the lock is advantageously arranged on a vertical bodywork section and the power closure is arranged on the opposite horizontal section, in order to utilize the installation space in a particularly favorable manner and to guarantee a secure closure of the vehicle door. The automatic power closure device advantageously has an electromotive actuator and thus supports the closing movement of the vehicle door.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
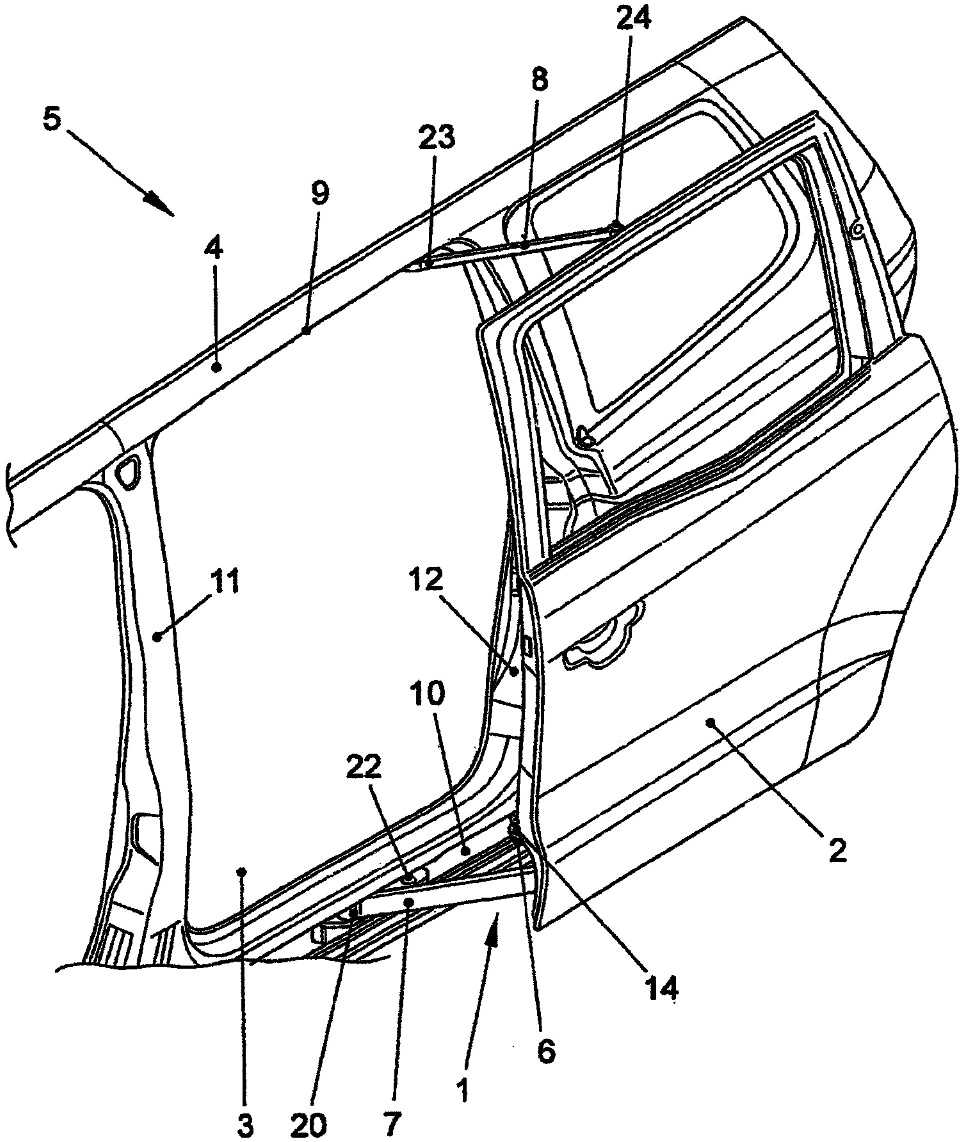
FIG. 1 illustrates an advantageous vehicle door arrangement in a perspective representation.

FIG. 1 shows in a perspective representation a preferred embodiment of a pivot device 1 of a vehicle door 2 for closing a door opening 3, which is embodied in a bodywork 4 of a vehicle, not shown in greater detail here, in particular a motor vehicle. The pivot device 1, vehicle door 2 and bodywork 4 thereby form an advantageous vehicle door arrangement 5. In this case the door opening 3 is the door opening of a second and/or third seating row of the vehicle.

The pivot device 1 of the vehicle door arrangement 5 comprises a carrying arm 6, which bears the weight of the vehicle door 2 on the bodywork 4, as well as a guide arm 7 and a guide arm 8, which together with the carrying arm 6 control the movement of the vehicle door. The carrying arm 6 as well as the guide arms 7, 8 each have the same length and are pivotally mounted on the bodywork 4 and on the vehicle door 2 such that they form a parallelogram. The carrying arm 6 and the guide arms 7 and 8 are in each case advantageously embodied as a hollow profile.

The door opening 3 is delimited at the top and at the bottom by respectively one bodywork section 9 or 10 running essentially horizontally and at the sides by respectively one bodywork section 11 or 12 running essentially vertically.

The carrying arm 6 and the guide arm 7 are pivotally mounted at the level of the horizontal bodywork section 10 delimiting the door opening 3 at the bottom. The guide arm 7 and the carrying arm 6 thus lie outside the field of vision of a person located in the vehicle, so that the inside of the vehicle door 2 can be designed freely and is not impeded by the presence of a carrying arm projecting into the interior of the vehicle. This means that on the one hand the design and on the other hand the ergonomics, in particular with respect to arm rests on the inside of the vehicle door, can be optimally designed. Due to the pivotal arrangement of the carrying arm 6 at the level of the bodywork section 10, furthermore, the carrying forces can be introduced into the vehicle door 2 in a particularly favorable manner, since the carrying arm 6 correspondingly engages on the lower edge region of the vehicle door 2. The vehicle door 2 thus bears with its weight on the carrying arm 6. Since a clear load distribution is thus ensured, the carrying arm 6 and the guide arms 7 and 8 can be designed structurally distinctly. The guide arms 7 and 8 need only to be dimensioned such that they can absorb or transmit the guide forces for the vehicle door 2. The carrying arm can be designed optimally with respect to its function.

Figure 2:
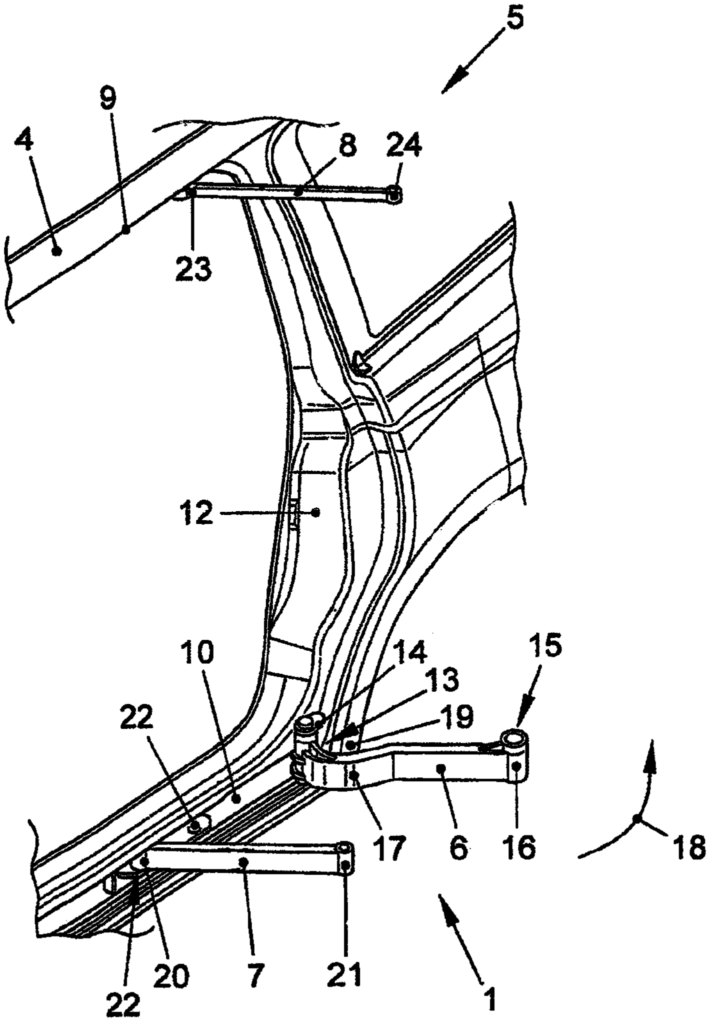
FIG. 2 is a pivot device of the vehicle door arrangement.

FIG. 2 shows the pivot device 1 in an enlarged representation without the vehicle door 2. It can be clearly seen hereby that a bodywork-side end 13 of the carrying arm 6 is connected to a first pivot joint 14, which is arranged on the vertical bodywork section 12. Due to the pivotable arrangement of the carrying arm 6 at the level of the horizontal bodywork section 10, the pivot joint 14 thus lies where the horizontal bodywork section 10 and the vertical bodywork section 12 meet. Particularly large forces can be transmitted here due to the high stability and strength. On its vehicle door-side end 15, the carrying arm 6 is connected to a pivot joint 16, of which only a joint sleeve of the carrying arm 6 is shown, which is arranged on the inside of the vehicle door 2. A curvature 17 in the carrying arm 6 near to the pivot joint 14 permits a further pivoting back of the carrying arm 6 in the direction of an arrow 18. The curvature 17 is designed such that a projecting bodywork region 19 of the bodywork 4 is circumvented in the swung open state of the carrying arm 6. The pivot angle of the carrying arm 6 can hereby be enlarged accordingly.

The guide arm 7 is pivotally mounted on the bodywork-side on a pivot joint 20 and on the vehicle door side by means of a pivot joint 21. In this case the guide arm 7 can be varied in its bodywork-side installation position. To this end, two or more receptacles 22 for the pivot joint 20 are provided on the bodywork side. For example, manufacturing tolerances and/or assembly tolerances can be compensated hereby and/or the pivot device 1 can be adapted to different vehicle doors 2.

The further guide arm 8 is connected to the bodywork 4 or the vehicle door 2 on the bodywork-side with a pivot joint 23 and on the vehicle door-side with a pivot joint 24. The pivot joint 23 in this case is thereby arranged on the horizontal bodywork section 9 delimiting the door opening 3 at the top so that the guide arm 8 likewise lies outside the field of vision of a person located in the vehicle 5. In principle, however, it is also conceivable to embody the pivot device 1 without the guide arm 8.

Figure 3:
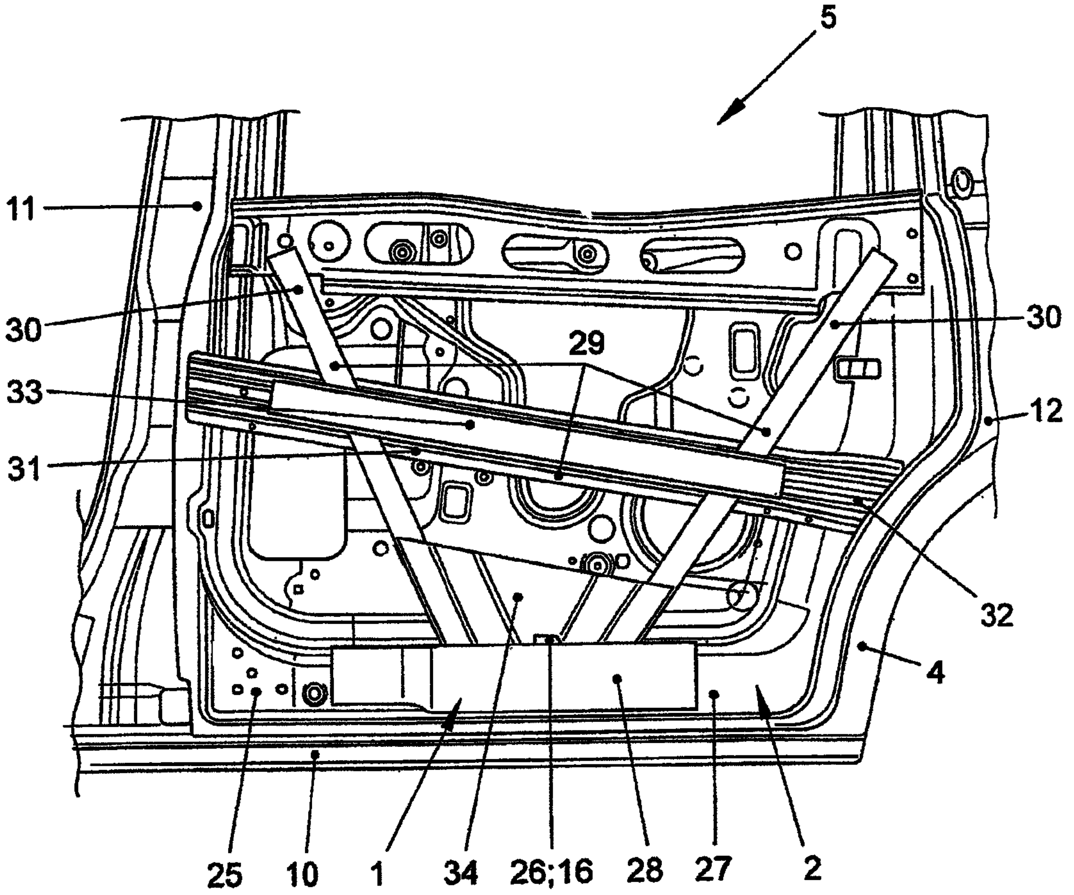
FIG. 3 is a vehicle door of the vehicle door arrangement in a plan view.

FIG. 3 shows a plan view of essentially the lower half of the vehicle door 2 without the exterior panel thereof. The load bearing components of the vehicle door 2 are shown, which are formed in particular by a frame 25 in the conventional manner. A stud 26, which together with the vehicle-side sleeve of the carrying arm 6 forms the pivot joint 16, is arranged on a horizontal section 27 delimiting the vehicle door 2 at the bottom, so that the holding force is introduced into the vehicle door 2 from the bottom via the carrying arm 6, as already stated above. The stud or the pivot joint 16 is arranged horizontally in the center on the frame 25. In this case this corresponds to the horizontal center of gravity of the vehicle door 2. In the closed state of the vehicle door 2, the section 27 lies opposite the horizontal bodywork section 10. The bodywork section 27, also referred to as a rocker panel, in this case has a reinforcement in the form of an additional sheet metal element 28.

A cross bracing 29, which is embodied essentially in a V-shaped manner, starts from the pivot joint 16. To this end, the cross bracing 29 has two braces 30, which widen starting from the pivot joint 16 or move apart from one another. At approximately half way a further brace 31 is arranged, which connects the braces 30 to one another. The braces 30 thereby cross an impact absorber 32, which extends between the vertical vehicle door sections or sections of the frame 25. The braces 30 can run behind or in front of the impact absorber 32 in the direction of sight and can optionally be connected thereto. Due to a corresponding embodiment of the impact absorber 32, the braces can also be guided through the impact absorber 32, as shown. The brace 31 ultimately gives the cross bracing 29 the shape of an uppercase letter A, which is upside down or the tip of which is assigned to the pivot joint 16. The braces 30, 31 can be screwed, welded, riveted, adhered and/or clamped to one another and/or to the vehicle door or the components thereof. The cross bracing 29 introduces the carrying force from the pivot joint 16 in a targeted manner into the vehicle door 2, in order to ensure a stable retention of the vehicle door 2. In this case furthermore cover plates 33 are arranged on the impact absorber 32, which further stabilize the construction.

Furthermore, in the lower region of the cross bracing 29, that is, close to the pivot joint 16, a connection plate 34 is provided, which is connected to the braces 30 and optionally to the pivot joint 16, in order in particular to support the cross bracing 29.

Overall, a vehicle door arrangement 6 is thus provided, which ensures a stable retention and a safe guidance of the vehicle door 2 in a simple and cost-effective manner. Due to the parallelogram, the vehicle door 2 is always aligned essentially parallel to the bodywork 4 during its movement. In this respect, the motion path of the vehicle door 2 corresponds essentially to that of a sliding door. Expediently, the pivot device 1 is embodied such that a pivot angle of 120° to 170°, in particular 150°, can be realized hereby.

Figure 4A:
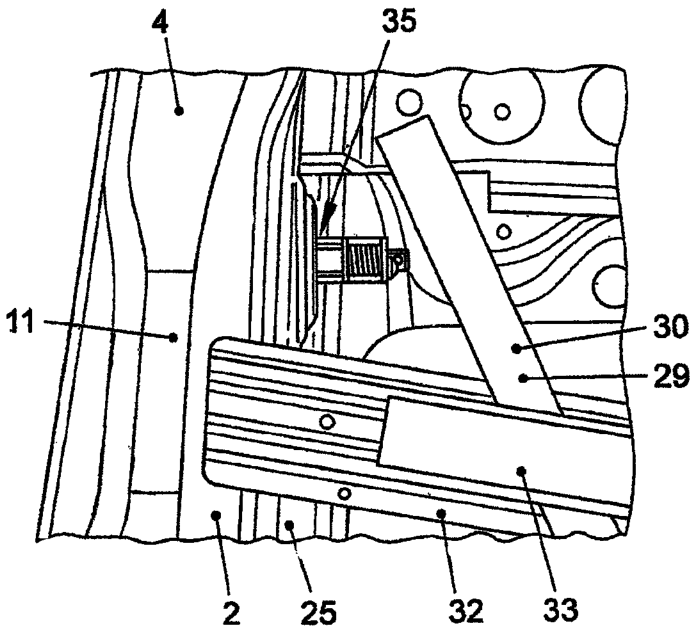
FIGS. 4A and 4B illustrate closing mechanisms for the vehicle door.
Figure 4B:
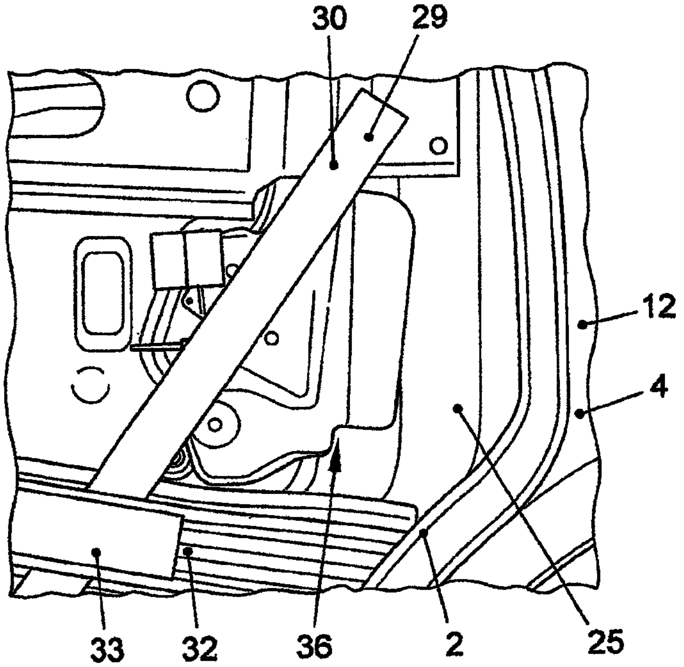

FIGS. 4A and 4B show closing mechanisms for the vehicle door arrangement 5, which render possible an advantageous closing of the vehicle door 2 to the bodywork 4. FIG. 4A shows to this end on the front vertical section of the frame 25 of the vehicle door 2 a so-called pivot lock 35, which can interact with a corresponding closing mechanism on the horizontal bodywork section 11.

FIG. 4B shows the rear vertical bodywork section 12 as well as the vertical bodywork section of the frame 25 of the vehicle door 2 lying therein. An automatic power closure device 36 is thereby arranged on the frame 25, which automatic power closure device automatically draws the vehicle door 2 into the door opening 3 and closes it therein as soon as the vehicle door 2 is located sufficiently far in the door opening 3. Advantageously, the power closure device 36 to this end has an electromotive actuator. The power closure device 36 thereby acts as a second lock of the vehicle door arrangement 5. In operation, a safe closing of the vehicle door 2 in the door opening 3 or the bodywork 4 is always thus ensured by means of the automatic power closure 36. An opening or closing operation can be introduced by means of the pivot lock 35. Optionally, however, the locking mechanism described above can also be realized without the power closure device 36.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:

a bodywork including a horizontal bodywork section;

a vehicle door configured to close a door opening in the bodywork of the vehicle; and a pivot device having a carrying arm bearing a weight of the vehicle door and a guide arm configured to control a movement of the vehicle door, wherein the carrying arm and the guide arm have substantially a same length and are arranged in a pivotally mounted manner on the vehicle door and the bodywork such that a space between the carrying arm, the guide arm, the bodywork and the vehicle door has a shape of a parallelogram, wherein the carrying arm is pivotally mounted at the horizontal bodywork section, the horizontal body work section disposed at a bottom of the door opening, and wherein a portion of the guide arm between the horizontal bodywork section and the vehicle door is straight and a portion of the carrying arm between the horizontal bodywork section and the vehicle door has a curvature section.

2. The vehicle according to claim 1, wherein the guide arm is pivotally mounted essentially at a same height as the carrying arm.

3. The vehicle according to claim 1, wherein a bodywork-side end of the carrying arm is connectable with a first pivot joint to a bodywork section running essentially vertically.

4. The vehicle according to claim 1, wherein the guide arm is variable in a length thereof or an installation position or a length and an installation position.

5. The vehicle according to claim 1, wherein the vehicle door has a cross bracing.

6. The vehicle according to claim 5, wherein the cross bracing is V-shaped.

7. The vehicle according to claim 5, wherein the cross bracing is provided with a connection plate at least in some regions.

8. The vehicle according to claim 1, wherein the vehicle door has at least one lock, a pivot lock or at least one automatic power closure device or at least one lock, a pivot lock, and at least one automatic power closure device.

9. The vehicle according to claim 1, wherein the guide arm is mounted at the horizontal bodywork section.

10. The vehicle according to claim 1, wherein the carrying arm and the guide arm have the same length.

11. The vehicle according to claim 1, wherein the carrying arm and the guide arm are parallel to each other.

12. The vehicle according to claim 1, wherein the bodywork further includes a vertical bodywork section, and wherein the carrying arm is arranged in the vertical bodywork section.

13. A vehicle comprising:

a bodywork including a horizontal bodywork section;

a vehicle door configured close a door opening in the bodywork of the vehicle;

a pivot device having a carrying arm bearing a weight of the vehicle door and a guide arm configured to control a movement of the vehicle door; and a further guide arm connectable to the vehicle door and the bodywork, the further guide arm being pivotally mounted at a second horizontal bodywork section at a top of the door opening, wherein the carrying arm and the guide arm have substantially a same length and are arranged in a pivotally mounted manner on the vehicle door and the bodywork such that a space between the carrying arm, the guide arm, the bodywork and the vehicle door has a shape of a parallelogram, and wherein the carrying arm is pivotally mounted at the horizontal bodywork section, the horizontal body work section disposed at a bottom of the door opening.

14. A vehicle comprising:

a bodywork including a horizontal bodywork section disposed along a bottom potion of the bodywork;

a vehicle door mounted on the bodywork;

a carrying arm mounted at a first end to the horizontal bodywork section and at a second end to the vehicle door; and a guide arm mounted at a first end to the horizontal bodywork section and at a second end to the vehicle door, wherein the carrying arm and the guide arm have a same length and are arranged in a pivotally mounted manner on the vehicle door and the bodywork such that a space between the carrying arm, the guide arm, the bodywork and the vehicle door has a shape of a parallelogram, and wherein a portion of the guide arm between the horizontal bodywork section and the vehicle door is straight and a portion of the carrying arm between the horizontal bodywork section and the vehicle door has a curvature section.

15. A vehicle comprising:

a bodywork including a horizontal bodywork section disposed along a bottom potion of the bodywork;

a vehicle door mounted on the bodywork;

a carrying arm mounted at a first end to the horizontal bodywork section and at a second end to the vehicle door;

a guide arm mounted at a first end to the horizontal bodywork section and at a second end to the vehicle door;

a guide arm mounted at a first end to the horizontal bodywork section and at a second end to the vehicle door;

a second horizontal bodywork section disposed along an upper portion of the bodywork; and a second guide arm mounted at a first end to the second horizontal bodywork section and at a second end to the vehicle door, wherein the carrying arm and the guide arm have a same length and are arranged in a pivotally mounted manner on the vehicle door and the bodywork such that a space between the carrying arm, the guide arm, the bodywork and the vehicle door has a shape of a parallelogram.

* * * * *